(12) United States Patent
Kuo

(10) Patent No.: US 7,528,734 B2
(45) Date of Patent: May 5, 2009

(54) SYSTEM AND METHOD FOR AUTOMATICALLY DETECTING POWER SUPPLY VOLTAGE

(75) Inventor: Heng-Chen Kuo, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 532 days.

(21) Appl. No.: 11/314,049

(22) Filed: Dec. 20, 2005

(65) Prior Publication Data

US 2006/0139834 A1 Jun. 29, 2006

(30) Foreign Application Priority Data

Dec. 23, 2004 (CN) ............... 2004 1 0091874

(51) Int. Cl.
- G08B 21/00 (2006.01)
- G01R 31/08 (2006.01)
- G01R 31/14 (2006.01)
- G01R 27/08 (2006.01)
- G01R 19/18 (2006.01)
- H01H 73/00 (2006.01)
- H01H 35/00 (2006.01)
- H02M 1/10 (2006.01)
- B23K 11/24 (2006.01)
- H02J 7/00 (2006.01)

(52) U.S. Cl. ............... 340/661; 340/635; 340/664; 324/522; 324/508; 324/713; 324/120; 361/115; 363/142; 307/112; 307/130; 307/66

(58) Field of Classification Search ............... 340/635, 340/661, 664; 324/522, 508, 713, 120; 307/66, 307/112, 130; 363/142; 361/115
See application file for complete search history.

(56) References Cited

U.S. PATENT DOCUMENTS

| | | | | |
|---|---|---|---|---|
| 4,415,964 A | * | 11/1983 | Scharfe, Jr. | 363/142 |
| 4,468,571 A | * | 8/1984 | Heavey et al. | 307/66 |
| 4,780,805 A | * | 10/1988 | Chewuk et al. | 363/142 |
| 5,001,623 A | * | 3/1991 | Magid | 363/143 |
| 5,045,718 A |  | 9/1991 | Vanderhoydonek et al. | |
| 5,374,855 A | * | 12/1994 | Hayasaka | 327/63 |
| 6,137,706 A | * | 10/2000 | Nesbitt et al. | 363/142 |
| 2003/0122605 A1 | * | 7/2003 | Ulrick et al. | 327/309 |
| 2005/0275371 A1 | * | 12/2005 | Bersiek | 320/111 |
| 2006/0015762 A1 | * | 1/2006 | Chiu | 713/340 |

* cited by examiner

Primary Examiner—Daniel Wu
Assistant Examiner—Jack Wang

(57) ABSTRACT

A system for automatically detecting power supply voltage includes a voltage divider connected to a power supply, an A/D converter connected to the voltage divider, a detection module connected to the A/D converter for comparing a digital signal converted by the A/D converter with a reference signal stored in the detection module, a relay driving circuit connected to the detection module, a relay connected to the relay driving circuit and the power supply respectively, and an outlet coupled to the relay for outputting voltage. If the digital signal matches the reference signal, the detection module controls the relay driving circuit to turn on the relay to output voltage at the outlet. Relevant method for detecting power supply voltage is also provided.

5 Claims, 2 Drawing Sheets

SYSTEM AND METHOD FOR AUTOMATICALLY DETECTING POWER SUPPLY VOLTAGE

BACKGROUND OF THE INVENTION

1. Field of the Invention

The present invention relates to an automatic voltage detection system and method, and more particularly to a system and a method for automatically detecting power supply voltage.

2. General Background

Electronic devices have generally required external power from an AC power source. Universal power source provides 110V (as used in Japan or the US) or 220V (as used in Europe, Australia and other countries) AC power. If 220V power is provided to an electronic device rated for 110V damage will result to the electronic device. If 110V power is provided to an electronic device rated for 220V, the electronic device will not function normally.

What is needed is a system and a method for automatically detecting power supply voltage to avoid mistaking 110V with 220V.

SUMMARY

A system for automatically detecting power supply voltage includes a voltage divider connected to a power supply, an analog to digital (A/D) converter connected to the voltage divider, a detection module connected to the A/D converter for comparing a digital signal converted by the A/D converter with a reference signal stored in the detection module, a relay driving circuit connected to the detection module, a relay connected to the relay driving circuit and the power supply respectively, and an outlet coupled to the relay for outputting voltage. If the digital signal matches the reference signal, the detection module controls the relay driving circuit to turn on the relay to output voltage at the outlet.

A method for automatically detecting power supply voltage is also provided. The method includes the steps of obtaining an AC voltage from a power supply; converting the AC voltage into a digital signal; comparing the digital signal with a reference signal, if a match, turning on a relay to output the AC voltage.

It is an advantage that the voltage level of an AC power supply is automatically detected before it is input into an electronic device. Therefore, a failure or malfunction of the electronic device due to using the wrong power source is avoided.

Other advantages and novel features will become more apparent from the following detailed description when taken in conjunction with the accompanying drawings, in which:

DETAILED DESCRIPTION OF THE EMBODIMENT

Figure 1:
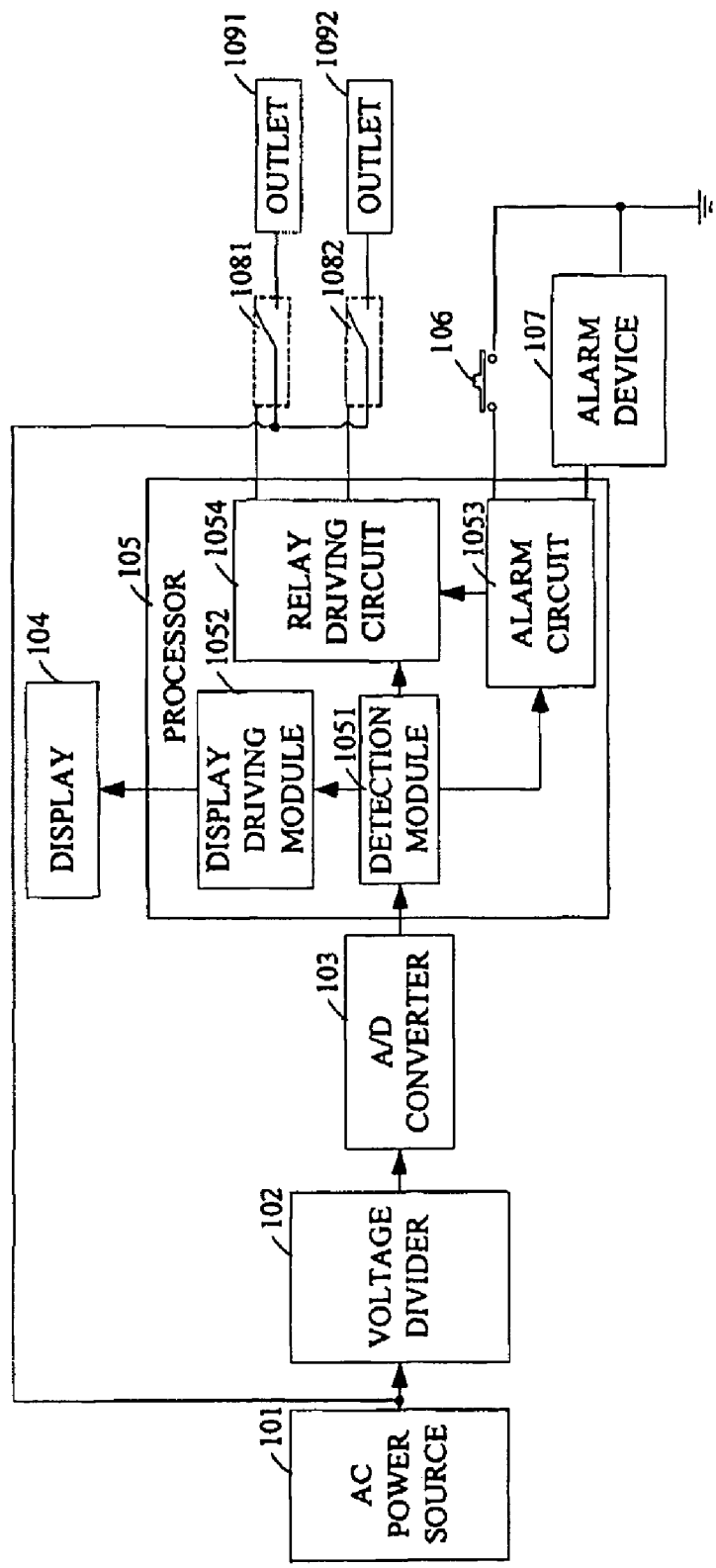
FIG. 1 is a schematic diagram of a system for automatically detecting power supply voltage in accordance with a preferred embodiment of the present invention.

Referring to FIG. 1, a system for automatically detecting power supply voltage includes an AC power source 101, a voltage divider 102, an A/D converter 103, a display 104, a processor 105, a button 106, an alarm device 107, two relays 1081 and 1082, and two outlets 1091 and 1092 corresponding to the relays 1081 and 1082 respectively.

The AC power source 101 is coupled to the voltage divider 102 and the relays 1081 and 1082 respectively. AC power is supplied to the voltage divider 102. When the relays 1081 and 1082 are turned on, the AC power is transferred to the outlets 1091 and 1092 via corresponding relays 1081 and 1082. The voltage divider 102 reduces the voltage sent from the AC power source 101. The voltage divider 102 is coupled to the A/D converter 103, and the A/D converter 103 converts AC voltage from the voltage divider 102 into a digital signal for the processor 105.

The processor 105 includes a detection module 1051, a display driving module 1052, an alarm circuit 1053, and a relay driving circuit 1054. The detection module 1051 is connected to the display driving module 1052, the alarm circuit 1053, and the relay driving circuit 1054 separately. The alarm circuit 1053 is connected to the relay driving circuit 1054.

The display driving module 1052 is connected to the display 104. The display 104 displays the value of the voltage output from the AC power source 101. The alarm circuit 1053 is connected to an input end of the alarm device 107 and an input terminal of the button 106, an output end of the alarm device 107 and an output terminal of the button 106 are grounded. The alarm device 107 is to warn the user when the AC power supply does not match a reference signal stored in the detection module 1051. The button 106 is for a user to confirm that the AC power supply 101 is the correct one. The relay driving circuit 1054 is connected to the relays 1081 and 1082 respectively.

The detection module 1051 of the processor 105 receives the digital signal transmitted from the A/D converter 103, and compares the value of the voltage output from the AC power source 101 to the reference signal. The display driving module 1052 is driven by the detection module 1051 to drive the display 104 to display the value of the voltage output from the AC power source 101.

The detection module 1051 compares the digital signal transmitted from the detection module 1051 with the reference signal stored in the detection circuit 1051. If it is the first time the system is used, the reference signal is a predetermined signal; if it is not the first time the system is used, the reference signal is a signal that the A/D converter 103 converted the previous time. If the digital signal from the A/D converter 103 matches the reference signal, the detection circuit 1051 drives the relay driving circuit 1054 to turn on the relays 1081 and 1082 thereby supplying power via the outlets 1091, 1092. If the digital signal from the A/D converter 103 is different from the reference signal stored in the detection circuit 1051, the detection circuit 1051 activates the alarm circuit 1053, the alarm circuit 1053 drives the alarm device 107 to give an alarm. The alarm device 107 remains on until the button 106 is pushed down, then the alarm circuit 1053 turns on the relay driving circuit 1054, meanwhile the digital signal converted by the A/D converter 103 is stored in the detection module 1051 as the reference signal.

The relay driving circuit 1054 is used for controlling the relays 1081 and 1082. The AC power supply is output to the outlets 1091 and 1092 via the relays 1081 and 1082.

The present invention detects 220V and 110V power supplies. The methods are the same in detecting 220V and 110V power suppliers. For instance, the method for detecting 220V power supply is illustrated as an example.

An AC voltage of 220V output from the AC power source 101 is divided by the voltage divider 102 within a range from −0.5V to +0.5V. The divided voltage is sent to the A/D converter 103 to be converted into a digital signal, then the digital signal is sent to the processor 105.

The detection module 1051 receives the converted digital signal and identifies the voltage then controls the display driving module 1052 to drive the display 104 to display the value of the voltage of 220V. The detection module 1051 compares the digital signal with the reference signal stored in the detection module 1051, if the digital signal is the same with the reference signal, the detection circuit 1051 drives the relay driving circuit 1054 to turn on the relays 1081 and 1082. The 220V voltage is output to the outlets 1091 and 1092 via the relays 1081 and 1082 respectively. If the digital signal is different from the reference signal, the detection circuit 1051 activates the alarm circuit 1053, the alarm circuit 1053 drives the alarm device 107. If the user affirms that the voltage of the AC power source is in the allowable range and pushes down the button 106, the alarm circuit 1053 receives a command sent by the button 106 and sends the command to the detection circuit 1051, the detection circuit 1051 drives the relay driving circuit 1054 to turn on the relays 1081 and 1082. The 220V voltage is output at the outlets 1091 and 1092 via the relays 1081 and 1082 respectively.

Figure 2:
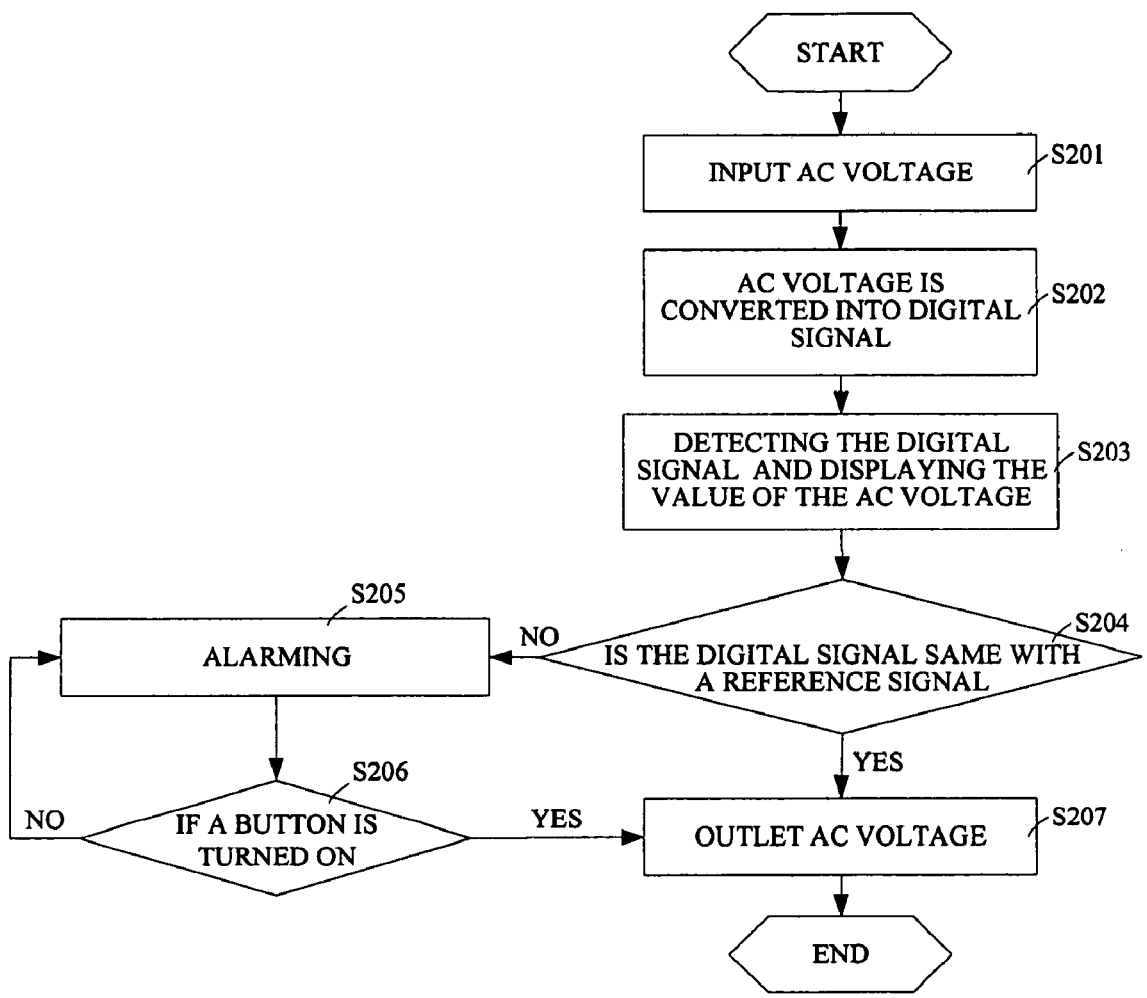
FIG. 2 is a flow chart of a method for automatically detecting power supply voltage in accordance with a preferred embodiment of the present invention.

Referring to FIG. 2, a flow chart of a method for automatically detecting power supply voltage in accordance with a preferred embodiment of the present invention is shown.

In S201, an AC voltage is supplied to the voltage divider 102 from the AC power source 101.

In S202, a divided voltage output from the voltage divider 102 is converted into a digital signal in the A/D converter 103, and the digital signal is sent to the detection module 1051 of the processor 105.

In S203, the detection module 1051 controls the display driving module 1052 to drive the display 104 to display the value of the AC voltage.

In S204, the detection module 1051 compares the converted signal with the reference signal stored in the detection module 1051, if a match, go to a step S207; if not, go to a step 205.

In S205, the detection circuit 1051 sends a command to the alarm circuit 1053, the alarm circuit 1053 drives the alarm device 107 to give an alarm.

In S206, the alarm circuit 1053 detects whether the button is closed, if so, the alarm circuit 1053 drives the relay driving circuit 1054 to execute step 207; if not, return to the step S205.

In S207, the relay driving circuit 1054 turns on the relays 1081 and 1082. The AC voltage from the AC power source 101 is output at the outlets 1091 and 1092 via the relays 1081 and 1082 respectively.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment of the invention.

What is claimed is:

1. A system adapted for automatically detecting power supply voltage, the system comprising:
   a voltage divider connected to a power supply source;
   an A/D converter connected to the voltage divider;
   a detection module connected to the A/D converter for comparing a digital signal converted by the A/D converter with a reference signal stored in the detection module;
   a relay driving circuit connected to the detection module;
   at least one relay connected to the relay driving module and the power supply respectively, said relay controlled by the relay driving module;
   at least one outlet coupled to said corresponding relay for outputting voltage;
   an alarm device;
   an alarm circuit connected to the detection module and the relay driving circuit, the alarm circuit adapted for driving the alarm device; and
   a button connected between the alarm device and the alarm circuit;
   wherein if the digital signal is the same with the reference signal, the detection module controls the relay driving module to turn on said relay to output voltage from a corresponding outlet, if the digital signal is different from the reference signal, the detection module controls the alarm circuit to drive the alarm device to give an alarm until the button is pushed, and after the button is pushed, the alarm circuit controls the detection circuit to drive said relay driving circuit to turn on said relay to output voltage from corresponding outlet, meanwhile the digital signal is stored in the detection module as the reference signal.

2. The system as claimed in claim 1, further comprising:
   a display; and
   a display driving module connected between the display and the detection module, adapted for driving the display to display a value of the voltage output from the power supply.

3. A method adapted a system for automatically detecting power supply voltage comprising the steps of: the said system obtaining an AC voltage from a power supply source; converting the AC voltage into a digital signal; and comparing the digital signal with a reference signal stored in a detection module, if a match, turning on a relay to output the AC voltage at an outlet, if the digital signal is different from the reference signal, an alarm device connected to an alarm circuit is activated; detecting whether a button connected between the alarm device and the alarm circuit is open or closed, if closed, turning on the relay to output the AC voltage at the outlet, meanwhile storing the digital signal in the detection module as the reference signal.

4. The method as claimed in claim 3, further comprising displaying the value of the voltage of the power supply at a display.

5. A method for adapted a system to monitoring power supply voltage, comprising the steps of: the said system providing an AC voltage from a power supply source; converting said voltage into a digital signal; displaying a value of said voltage according to said signal; outputting said voltage when said voltage is identified as acceptable based on said signal, wherein said digital signal is in comparison with a reference signal stored in a detection module in order to identify whether said voltage is acceptable; activating an alarm device connected to an alarm circuit when said voltage is identified as unacceptable based on said digital signal; and detecting whether a button connected between said alarm device and said alarm circuit is open or closed, if closed, outputting said voltage and storing said digital signal in the detection module as said reference signal.

* * * * *